United States Patent [19]

Forward et al.

[11] 4,034,995

[45] July 12, 1977

[54] TANDEM WHEELED ROLLER SKATE HAVING SPHEROIDAL ROLLERS

[76] Inventors: Daniel Forward, 60 Parkridge Road, Kirkland, Quebec; George Carr Woolley, 135 Berlioz Shore, Apt. 1N, Nuns Island, Quebec; Donald Daoust, 2185 Manon Street, Chomedey, Quebec, all of Canada

[21] Appl. No.: 631,417

[22] Filed: Nov. 12, 1975

[30] Foreign Application Priority Data

Oct. 22, 1975 Canada .................................. 238162

[51] Int. Cl.$^2$ .......................................... A63C 17/06
[52] U.S. Cl. ............................ 280/11.23; 280/11.3; 301/5.7
[58] Field of Search ......... 280/11.23, 11.22, 11.27, 280/11.26, 7.13, 11.1 R, 11.19, 11.36, 11.25, 11.3; 301/5.3, 5.7; 36/89, 115, 114

[56] References Cited

U.S. PATENT DOCUMENTS

| | | | |
|---|---|---|---|
| 251,321 | 12/1881 | True | 280/11.23 |
| 617,996 | 1/1899 | Ruel | 280/11.19 |
| 979,169 | 12/1910 | Kennedy | 280/11.23 |
| 988,533 | 4/1911 | Zverina | 280/11.23 |
| 2,122,311 | 6/1938 | Campbell | 280/11.28 |
| 2,261,453 | 11/1941 | Reinhart et al. | 36/89 |
| 2,377,366 | 6/1945 | Paystrup | 280/11.25 |
| 2,529,314 | 11/1950 | Schmid | 280/11.23 |
| 2,559,118 | 7/1951 | Foran | 280/11.23 |
| 2,719,724 | 10/1955 | Lundgren | 280/11.23 |
| 3,501,162 | 3/1970 | Toone | 280/11.23 |
| 3,649,038 | 3/1972 | Huckenbeck | 280/11.19 |
| 3,693,988 | 9/1972 | Steinhiser | 280/11.23 |
| 3,936,061 | 2/1976 | Wada | 280/11.23 |
| 3,939,583 | 2/1976 | Daumann | 280/11.3 X |

FOREIGN PATENT DOCUMENTS

| | | | |
|---|---|---|---|
| 772,044 | 11/1967 | Canada | 280/11.23 |
| 592,486 | 2/1934 | Germany | 301/5.7 |
| 741,159 | 11/1955 | United Kingdom | 280/11.23 |
| 16,718 | 1909 | United Kingdom | 280/11.1 ET |
| 837,828 | 6/1960 | United Kingdom | 280/11.28 |

Primary Examiner—Joseph F. Peters, Jr.
Assistant Examiner—Milton L. Smith
Attorney, Agent, or Firm—Birch, Stewart, Kolasch and Birch

[57] ABSTRACT

A novel roller skating device includes the combination of a boot having the general appearance of an ice skate boot, including a rear section adjacent the region of the tibia extending beyond the region of the Achilles tendon. The rear section extends along the sides of the boot and curvingly projects above the region of the malleoli. An additional section of the boot surface follows the region of the instep, from a section abutting the rear section, in order to provide rows of lace accepting holes. The rows of lace accepting holes end just above the region of the toe joints. The skating device includes a front roller assembly secured to the toe portion area of the boot, and a rear roller assembly secured to the heel portion area of the boot. Each of the front roller assembly and the rear roller assembly includes a bridge sub-assembly of an inverted generally U-frame shape, including a base and a pair of spaced preferably inwardly prestressed depending wings, and a hollow spheroidal roller having axially disposed, diametrically opposed bearing surfaces, rotatably operatively engaged with respect to the spaced apart wings, the hollow roller being a globular roller comprising a hollow spheroidal, inner, rigid relatively thin walled core of structurally strong material, covered by a coating of a resilient material thereon. The base section of the forward roller assembly is centrally positioned and disposed below the matatarsal head. A rear roller assembly is also secured to the heel portion of the rear assembly. The rear member has a base section centrally positioned and disposed below the calcaneous. The apex of the inverted generally U-shaped members form an axle for the globular rollers for both the front roller assembly and the rear roller assembly.

32 Claims, 30 Drawing Figures

TANDEM WHEELED ROLLER SKATE HAVING SPHEROIDAL ROLLERS

BACKGROUND OF THE INVENTION i. Field of the Invention

This invention relates to roller skates of the type having a single central front roller and a single central rear roller disposed in tandem.

ii. Description of the Prior Art

In roller skates of the above mentioned type, problems exist in providing a skate having a pleasing aesthetic appearance as well as one which would have sufficient strength and provide easy running and proper manoeuverability. Thus, in order to provide a roller skating device of the above mentioned type, previous patentees have resorted to various expediencies in order to provide the proper stability. For example H.L. True, in U.S. Pat. No. 251,321, patented Dec. 20, 1881, and A. J. Kennedy, in U.S. Pat. No. 979,169, patented Dec. 20, 1910, provided complicated and awkward stabilizing devices between the bottom of the skate and the ankle of the wearer of the skate. This was not entirely satisfactory, as it still did not provide a skate having both sufficient stability and a pleasing aesthetic appearance.

The problem of noisy operation was attempted to be solved in Canadian Pat. No. 132,398, patented Apr. 11, 1911, in the name of Jan Zverina, in which non-rotary axles were mounted in brackets and tubular roller hubs were revolvably mounted on the axles and were provided with lateral passages and pneumatic tires mounted on the hubs with inflation valves located in the passages. This obviously suffered the disadvantages inherent in the use of pneumatic tires with respect to duration of operability.

The problem of monoeuverability was attempted to be solved in U.S. Pat. No. 2,122,311, patented June 28, 1938, in the name of William R. Campbell, the skate included a trailing front roller, that is, the horizontal axis of the roller was located in the rear of the vertical axis of the roller frame, the front roller being of the ball bearing castor-type so that when the skater turned on the edge of the skate, the roller would swivel and facilitate movement of the skate when moving in a curved direction of travel. While this was satisfactory on smooth surfaces, the use of a castor-type wheel obviously was unsatisfactory for uneven surfaces or unpaved roads or other such surfaces or hard packed grassy hills, etc.

An attempt to improve the stability of the skate was provided by U.S. Pat. No. 2,529,314, of Nov. 7, 1950, in the name of Max Wilhelm Schmid, wherein the wheels or rollers of the device had ball shaped or spherical running surfaces and were supported relatively to the plate platform or the like by means of axle forks which were so shaped that the lower parts would be disposed together with the securing means in the outer ends of the bearing bushings or hubs carried by the rollers, with the bushings or hubs being recessed within the rollers and the arrangement being such that the maximum inclination of the device may be obtained when taking curves, performing arcs or figures or the like. A deficiency of this particular structure, however, was the lack of sufficient stabilisers to support the ankle of the wearer, as well as the excessive weight of the ball shaped or spherical rollers.

It was attempted, in U.S. Pat. No. 2,719,724, of R. Lundgren, patented Oct. 4, 1955, to provide a roller mounted device, more particularly a floating axle roller skate which can be easily steered by a skater. A deficiency of this particular device resided in the fact that a offset castor effect was provided, thereby making it difficult to skate on hard packed, unpaved roads or on hard packed grassy hills and slopes. In addition, the rollers were substantially cylindrical solid rubber rollers, and the means of supporting the shoe to the base plate was not sufficient to provide a suitable and sufficient support for the ankles of the wearer.

The problem of providing a skating device for skating on various land surfaces in a comparatively silent and noiseless manner, was provided in Canadian Pat. No. 772,304, issued Nov. 21, 1967, in the name of Eric H. Bown, by providing a skating device with an extensible floor to support the feet of the operator, with spherical or globular shaped balls adequately secured below the extensible floor and secured in a tandem manner, with specific provision being made for stabilising the ankles of the wearer. However, a deficiency of this type of device, was the excessive weight of the solid globular rollers.

The problem of providing a skate structure which would increase the speed of manoeuverability of the skates, was attempted to be solved in U.S. Pat. No. 3,501,162, patented Mar. 17, 1970, in the name of Dean W. Toone, by providing for variation in camber as the wheel turns. However, a suitable securement of the shoe of the user to the roller skate construction was not provided in a manner which would provide the necessary stability.

British Pat. No. 741,159, provided roller skates including a foot plate or platform at the underside of which were two supporting rollers of spheroidal shape mounted in tandem, and also provided a means for pivotally moving the brackets supporting the spheroidal shaped rollers relative to the plate about an axis located on the longitudinal center line of the plate. However, a difficulty of this patent resides in the fact that the spherical rollers are of a solid rubber, thereby adding excessive weight to the skating device. In addition no sufficient means were provided for adequately supporting the shoes of the user on the skate.

Finally, the problem of providing adequate steerability to the skate was attempted to be solved in Canadian Pat. No. 933,967, patented Sept. 18, 1973, in the name of Paul F. Steinhiser, in which the bracket supporting the wheels was pivotally mounted intermediate the wheels in contact with the body about a pivot axis intersecting the longitudinal axis of the plane and spaced from the axle with the steering means including resilient spring means seated on the bracket for yieldably resisting pivotal displacement by unbalanced lateral pressure on the wheel. However, adequate support to provide sufficient stability to the user, was not provided.

SUMMARY OF THE INVENTION i. Aims of the Invention

Accordingly, the problem of providing a skating device which is easily operated, efficient and economically manufactured and durable, and yet moving relatively noiselessly and slidably in a gliding sensation and manner over wide and extensive styles and types of terrain, with reduction of the noise and diminishing the feeling of uncertainty in erratic movement to a minimum when in contact with the surfaces upon which it glides, rolls or rides, still has not been solved. An object therefore of the invention is to provide a skating device which is easily operated, efficient, economically manufactured, durable, and one which slides freely across or along side walks having expansion strips, roads constructed of concrete, macadam, hard packed gravel, smooth country roads, brick patios, close cropped grass, or any such surfaces, whether naturally or specifically constructed as indoor skating arenas.

ii. Statement of Invention

Accordingly, by this invention there is provided, as a roller skating device, the combination of a boot having the general appearance of an ice skate boot; a front roller assembly secured to the toe portion area of the boot, the front roller sub-assembly including a bridge assembly of an inverted generally U-frame shape, including a base and a pair of spaced apart preferably inwardly prestressed depending wings, a hollow spheroidal roller having axially disposed diametrically opposed bearing surfaces, rotatably operatively engaged with respect to the spaced apart wings, the hollow roller being a globular roller comprising a hollow spheroidal, inner, rigid, relatively thin walled core of structurally strong material, covered by a coating of a resilient material thereon; and a rear roller assembly secured to the heel portion of the rear assembly, including a bridge sub-assembly of an inverted generally U-frame shape, including a base and a pair of spaced apart preferably inwardly prestressed depending wings, a hollow spheroidal roller having axially disposed, diametrically opposed, bearing surfaces rotatably operatively engaged with respect to the spaced apart wings, the hollow spheroidal roller being a globular roller comprising a hollow spheroidal, inner, rigid, relatively thin walled core of structurally strong material covered with a coating of a resilient material.

This invention also provides a roller assembly including a bridge sub-assembly of an inverted generally U-frame shape, including a base and a pair of spaced apart preferably inwardly prestressed depending wings a hollow spheroidal roller having axially disposed, diametrically opposed, bearing surfaces, rotatably operatively engaged with respect to the spaced apart wings, the hollow roller being a globular roller comprising a hollow spheroidal, inner, rigid, relatively thin walled core of structurally strong material, covered by a coating of a resilient material thereon.

iii. Other Features of the Invention

In one variant, both the front and rear assemblies are directly secured to the sole, for example, by rivets, screws, by clinched-over pins, etc., while in another variant, the front and rear assemblies are secured to, or are integral with, a common plate, which in turn is secured to the sole, for example, by rivets, by screws, by clinched-over pins, etc.

In another variant, each of the front and rear bridge assemblies includes at least one upwardly extending stud or boss which is used as the means for securing the bridge assembly to the sole of the skate boot in the manner as previously described.

In another variant, the generally U-shape frame is in the form of an open bottom semi-globule.

In another variant, at least the sole portion of the skate boot is formed of polyurethane, and the plate includes an engaging surface of a polycarbonate resin so that the securement involves a fusion or welding of the polyurethane with the polycarbonate. The boot may be formed substantially entirely out of the polyurethane, or it may include only the sole made of the polyurethane with the remainder of the boot being made of polyvinyl chloride or leather, or any other suitable leather like material.

The boot can have, as an incorporated element, a stiffener in the from of a vertical member acting as an ankle support. The stiffener could be either a vertical member along or a vertical member combined with a horizontal sole plate.

In the case of a polyurethane boot the stiffener can be either an add-on element integrated within the boot structure, or encapsulated within the polyurethane. In the case of vinyl or leather, the stiffener would be an add-on.

The polycarbonate surface may be substantially entirely polycarbonate, or it may be a glass fiber-reinforced nylon laminated to an exposed surface of a polycarbonate.

The entire plate portion may be provided with a polycarbonate surface, or alternatively, the base of the inverted generally U-frame shaped bridge sub-assembly can be provided with a polyurethane surface for the securement of the bridge sub-assembly to the skate.

In another variant, the hollow spherical globular rollers are provided with roller or ball bearings and a shaft is rotatably secured thereto, and the shaft is fixedly secured to the spaced apart inwardly prestressed wings.

In another variant, the hollow spheroidal globular rollers are provided with a race in which is provided suitable bearing surfaces, and this race is fixedly secured to the diametric ends of the globular roller, and the inwardly prestressed, spaced-apart wings are provided with stub shafts which engage with the above identified and described bearing surfaces.

In one particular variant, the forward bridge member includes an upper base of oval plan shape, a pair of spaced apart inwardly prestressed depending wings, and means associated with the base, for enabling securement of the bridge sub-assembly to the toe area of the skate boot.

In another variant, the rear includes a base of generally rectangular plan shape, a pair of spaced apart inwardly prestressed depending wings, and means associated with the base for enabling securement of the rear bridge sub-assembly to the heel area of the skate boot.

In a specific variant, the boot includes a rear section adjacent the region of the tibia extending beyond the region of the achilles tendon, such rear section extending along the sides of the boot and curvingly projecting above the region of the malleoli; and an additional section of the boot surface following the region of the instep, from a section abutting such rear section, thereby to provide rows of lace accepting holes, such rows of lace accepting holes ending just above the region of the toe joints, particularly where the front roller assembly is disposed along the central longitudinal axis and is disposed below and slightly ahead of the region of the metatarsal head, and wherein the rear roller assembly is disposed along the central longitudinal axis and is disposed below the region of the calcaneous.

Brief Description of the Invention

In the accompanying drawings.

DESCRIPTION OF EMBODIMENT OF THE INVENTION i. Description of FIG. 1-3

Figure 1:
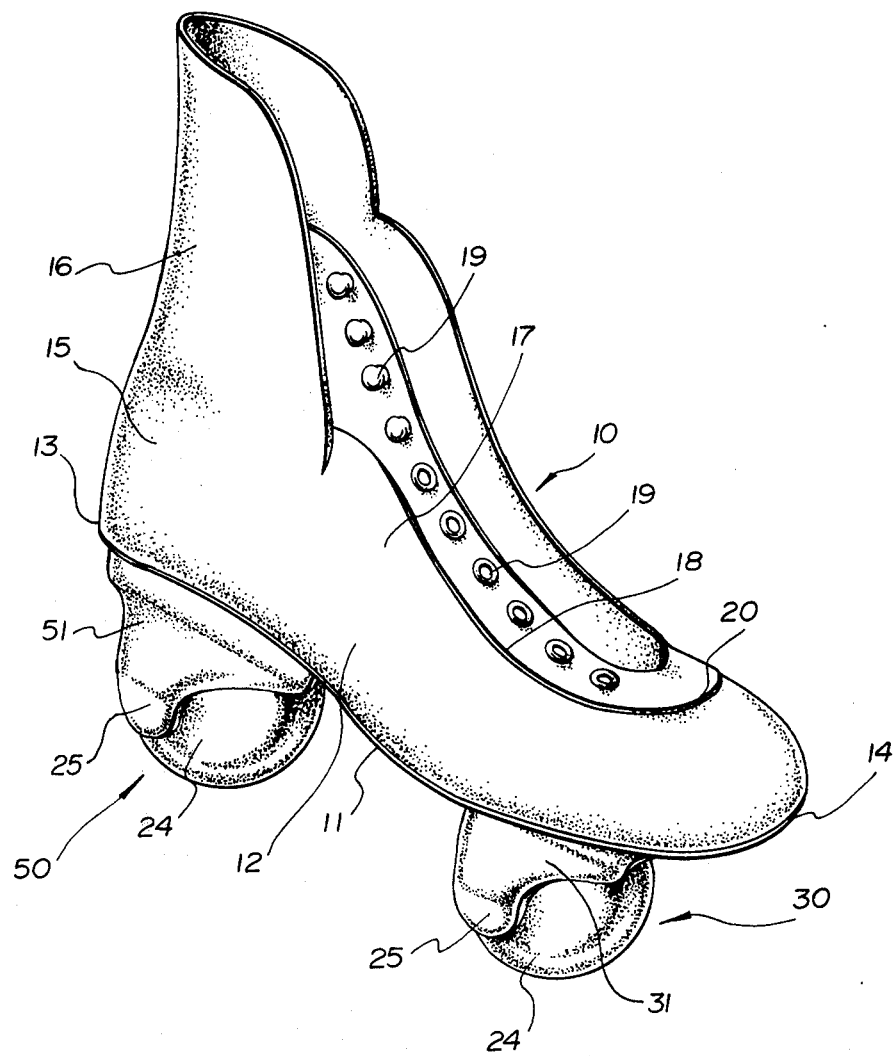
FIG. 1 is a perspective view of the skate of one embodiment of this invention.

As seen in FIG. 1, the embodiment of the roller skate of the invention includes a skate boot 10 to which are rigidly secured a front roller assembly 30 and a rear roller assembly 50. The skate boot 10 is of generally the configuration and appearance of an ice skate, and includes a sole portion 11 and an upper portion 12, having a heel portion 13 and a toe portion 14. The skate boot 10 has a rear section 15 adjacent the tibia and this extends beyond the region 16 of the achilles tendon. The rear section 14 extends along the sides of the boot and curvingly projects above the region 17 of the malleoli. An additional section of the boot surface follows the region 18 of the instep, from a section abutting the rear section 15, in order to provide rows of lace-accepting holes 19. The rows of lace accepting holes 19 end just above the region 20 of the toe joints. It will be observed that the configuration of the boot is substantially different from conventional configurations in that the heel portion 13 is disposed at an elevation higher, rather than, as in the conventional case, lower, than the toe portion 14. This is for the purpose of providing greater stability, as will be explained hereinafter.

Figure 2:
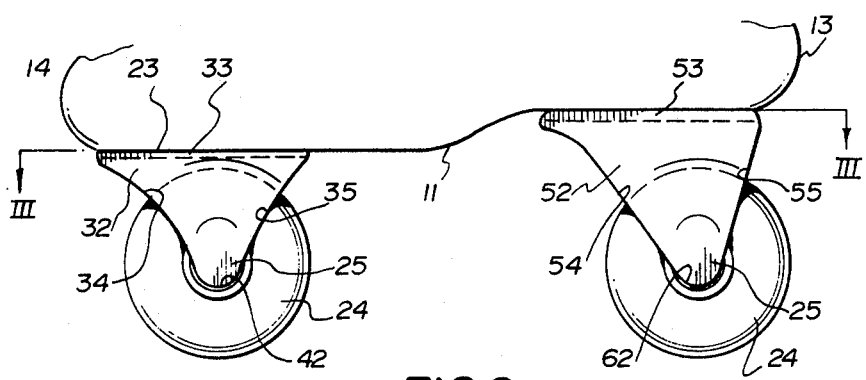
FIG. 2 is a side elevational view of the skate of one embodiment of this invention.
Figure 4:
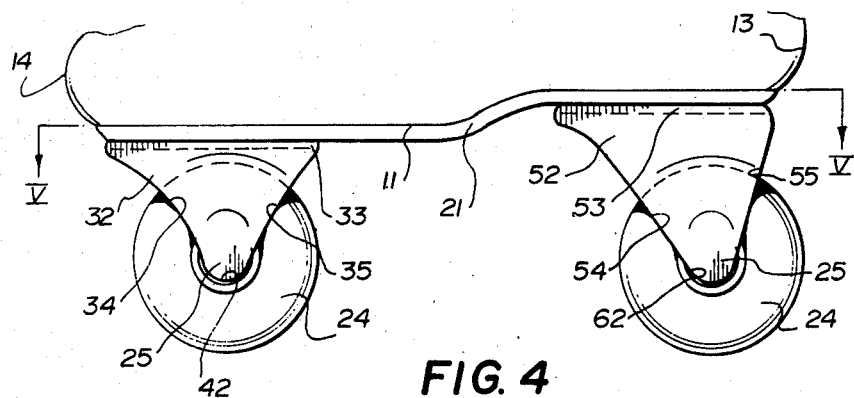
FIG. 4 is a side elevational view of a second embodiment of the skate of this invention.

Each of the roller assemblies 30,50 includes a pair of spaced apart downwardly inwardly prestressed depending wings, 31, 32, and 51, 52, and an upper base portion 33,53, which is secured to the sole portion 11 of the skate boot. As shown in FIG. 2, these assemblies 30,50, are secured directly to the sole 11 of the skate boot 10, whereas as shown in FIG. 4, these assemblies are secured to a common plate 21 which in turn is secured to the sole 11 of the skate boot 10.

Figure 3:
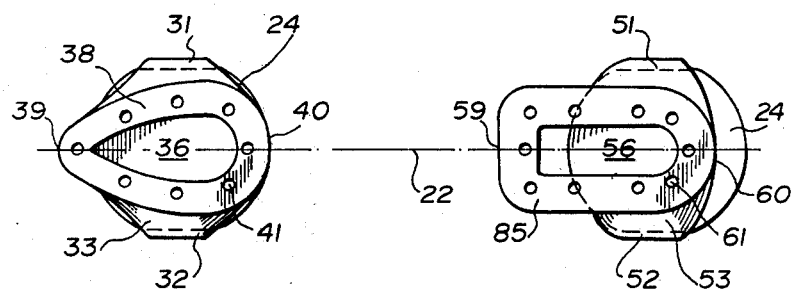
FIG. 3 is a view looking on the line III—III of FIG. 2.

As seen in FIGS. 2 and 3, the front assembly 30 is of generally U-shape and includes a base 33 and a pair of downwardly depending spaced apart inwardly prestressed wings 31,32. In side elevation, these wings are of an aerodynamic pleasing configuration, having a sweeping leading edge 34 and a faired trailing edge 35. The upper surface 36 of the base 33 is of generally oval plan shape having the appearance of a track 38, including a pointed front portion 39 and a gently curved end portion 40, and provided with means associated with the base for enabling securement of the bridge sub-assembly to the toe area of the skate boot; in this embodiment, the mean is a plurality of securement apertures 41.

It will be seen that the front assembly 30 is disposed along the central longitudinal axis 22 of the boot 10, but is secured to the sole area 11 at a position which is disposed below the region 23 of the metatarsal head.

Similarly, the rear assembly 50 is of generally inverted U-shape and includes the base 53, with the pair of spaced apart inwardly prestressed depending wings 51,52. The depending wings 51,52 in side elevation, include a swept back leading edge 54 and a gently faired trailing edge 55. The upper surface 56 of the base 53 is of substantially rectangular plan shape. It has the appearance of a track 58 and includes a flattened forward portion 59 but a gently curved semi-circular rear portion 60 and is provided with means associated with the base for enabling securement of the bridge sub-assembly to the heel area of the boot; in this embodiment the means is spaced apart apertures 61, for securement to the rear portion 13 of the skate boot 10.

It will be noted that the rear assembly 30 is disposed along the central longitudinal axis 22 of the boot 10, but is secured at a position 24 which is disposed below the region of the calcaneous. It will also be observed that the apices 42,43, and 62,63 of the spaced apart, inwardly prestressed wings 31,32 and 51,52, respectively, form axles 25 for the globular rollers 24.

ii. Description of FIGS. 4 and 5

Figure 5:
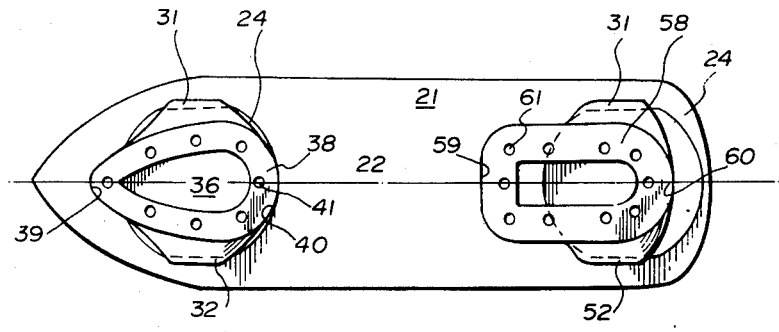
FIG. 5 is a view looking on the line V—V, but with certain areas removed for clarity.
Figure 6:
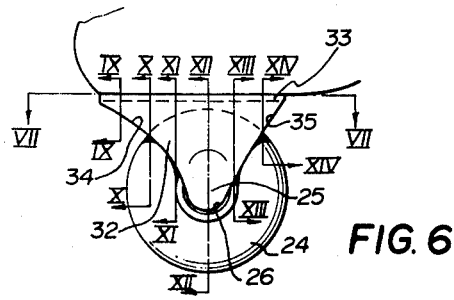
FIG. 6 is a side elevational detailed view showing the front roller assembly.
Figure 7:
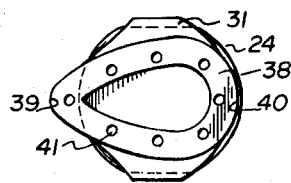
FIG. 7 is a view along the line VII—VII of FIG. 6.
Figure 8:
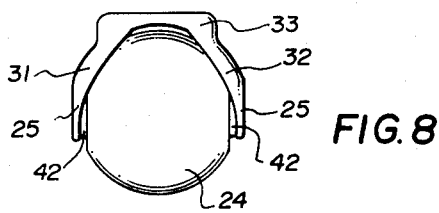
FIG. 8 is a front elevational view of the assembly of the FIG. 6.
Figure 9:
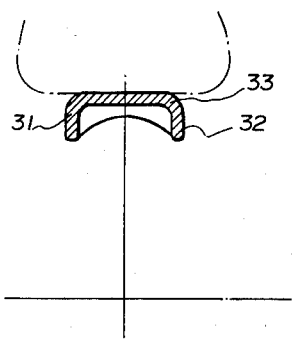
FIGS. 9–14 are sectional views along the lines IX—IX, X—X, XI—XI, XII—XII, XIII—XIII and XIV—XIV respectively, of FIG. 6.
Figure 10:
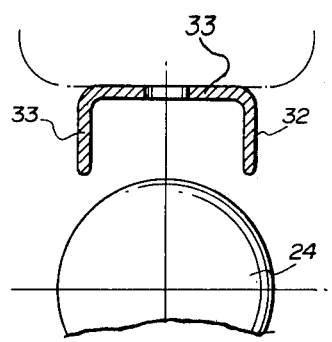
Figure 11:
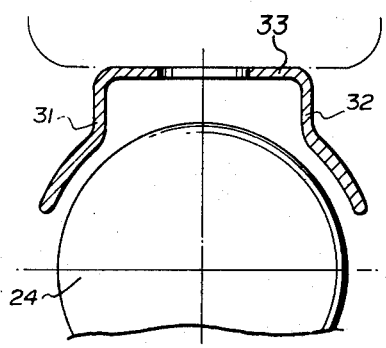

As shown in FIGS. 4 and 5, the front 30 and rear 50 roller assemblies are secured to a common plate 21 which is itself secured to the sole 11 of the skate boot 10. It is possible to secure, the plate to the sole, by cooperation between the apertures 41,61, in the bases 33,53 and either the sole 11 of the skate boot 10 or the common plate 21 with suitable securing means (not shown) including rivets, screws, bolts and pins, which are clinched on the inside of the sole 11 or of the common plate 21, after being inserted through the apertures 41,61, and mating apertures, not shown, in the sole 11 or the plate 21.

iii. Description of Advantageous Embodiment

A particular advantageous embodiment of the invention involves taking advantage of the adhesion between a polycarbonate resin and a polyurethane resin. Thus, it is possible to form the sole 11 of a skate boot 10, from a polyurethane resin and to form either the bases 33,53 of the common plate 21 of a polycarbonate resin. The application of heat and pressure causes a fusion or welding of the polyurethane and the polycarbonate, thereby providing an integral bond. It is not necessary to provide a solid polycarbonate resin, but one may provide a glass fiber-reinforced nylon/polycarbonate laminate which can be integrally bonded or welded to a polyurethane surface.

iv. Description of FIGS. 6–14

Figure 12:
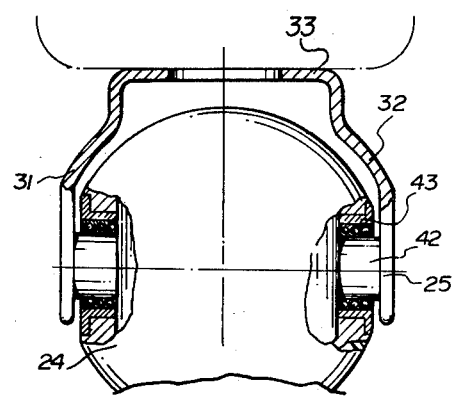
Figure 13:
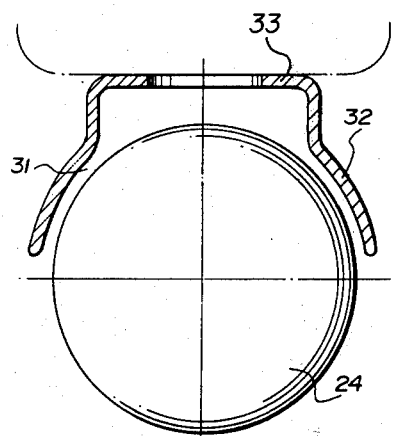
Figure 14:
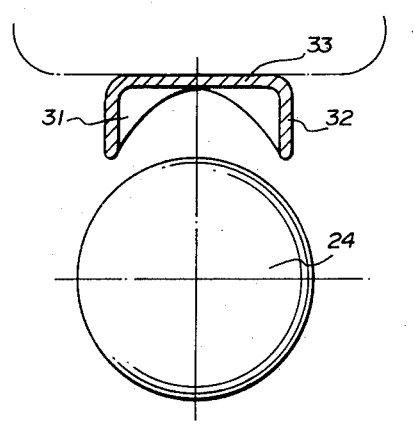
Figure 15:
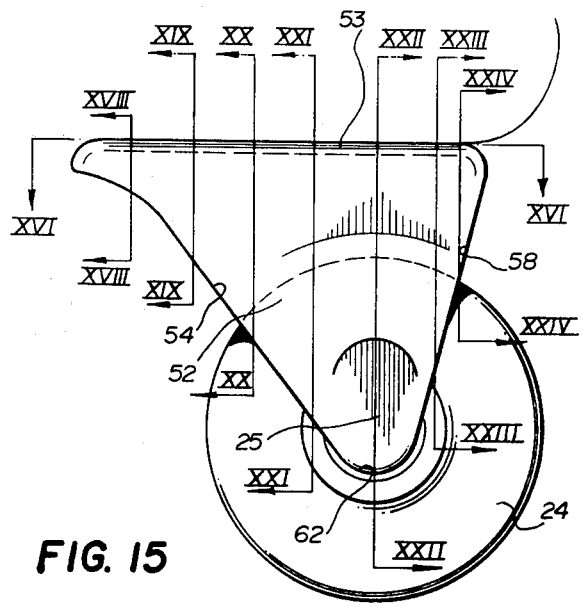
FIG. 15 is a side elevational view showing in detail the rear roller assembly.
Figure 16:
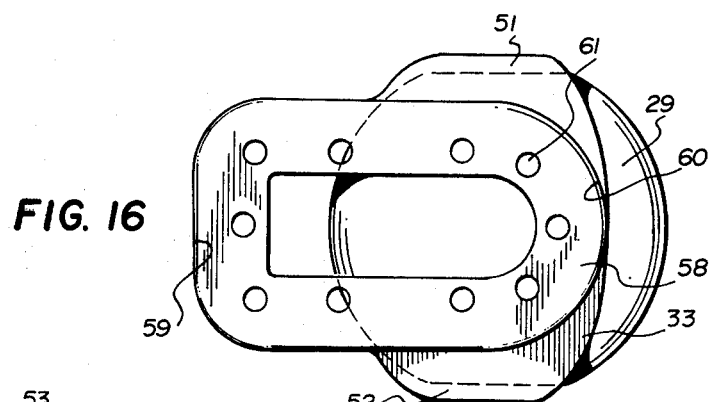
FIG. 16 is a view along the line XVI—XVI of FIG. 15.
Figure 17:
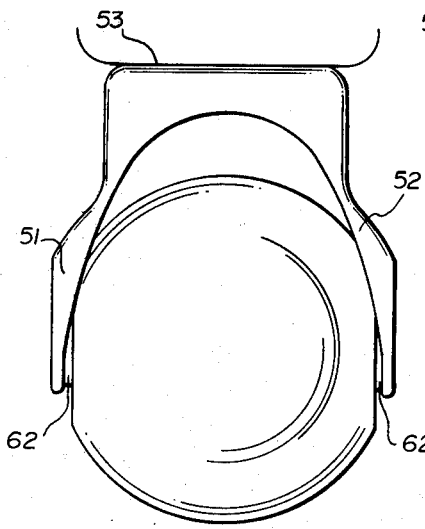
FIG. 17 is a front elevational view of the assembly of FIG. 15.
Figure 18:
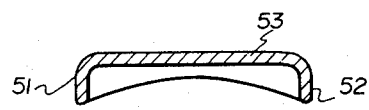
FIGS. 18-24 are sectional views along the lines XVIII—XVIII, XIX—XIX, XX—XX, XXI—XXI, XXII—XXII, XXIII—XXIII, and XXIV—XXIV respectively of FIG. 15.
Figure 19:
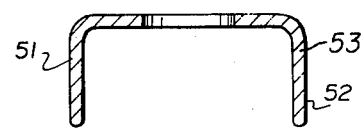
Figure 20:
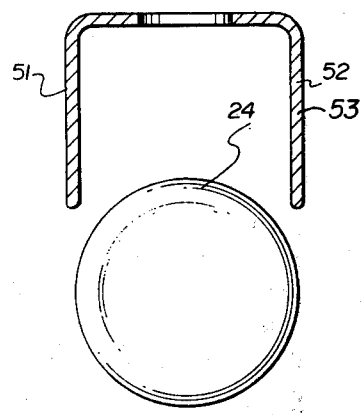
Figure 21:
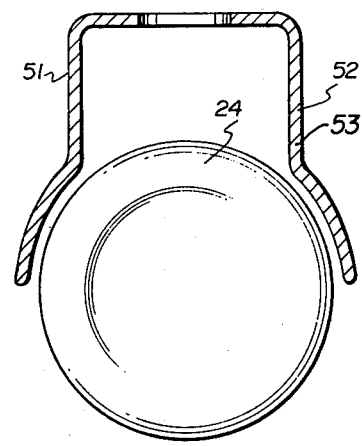

The inter-relationship between the globular roller 24 for the front roller assembly 30 is shown in FIGS. 6–14, and for the rear roller assembly 50 is shown in FIGS. 15–24. It is seen in FIGS. 6–14, that the inverted generally U-frame truss 31,32,33 includes inwardly pre-stressed wing portions 31,32 which as shown particularly in FIG. 12, are provided with stub shafts 42 which cooperate with bearings 43 in the globular roller. This provides a self contained mounting system for the globular roller 24 on the bridge system 31,32,33, without the necessity of a transverse separate axle. However, while not shown, in this figure, but as will be shown hereinafter, it is possible to provide a separate fixed axle extending transversely across the wings 31,32 with the globular roller 24 being rotatably mounted on suitable bearings 43 on the fixed axle.

v. Description of FIGS. 15–24

Figure 22:
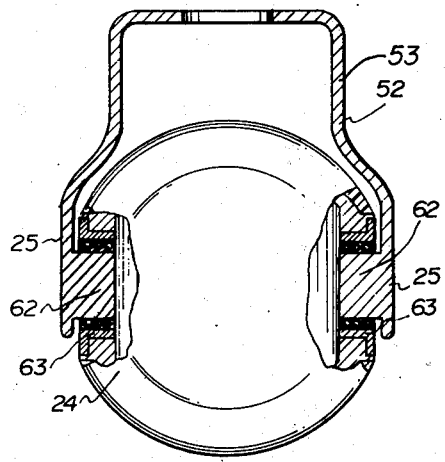
Figure 23:
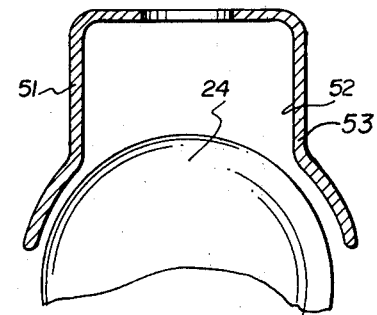
Figure 24:
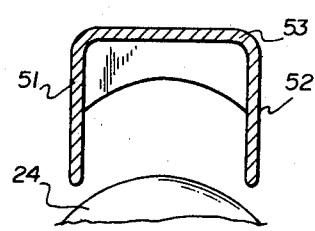
Figure 25:
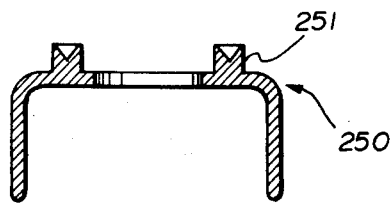
FIGS. 25 and 26 show two alternative ways of securing the bridge of the sole.

It is seen in FIGS. 15–24 that the inverted generally U-frame truss 51,52,53 includes inwardly pre-stressed wing portions 51,52 which as shown particularly in FIG. 22, are provided with stub shafts 62 which cooperate with bearings 63 in the globular roller 24. This provides a self contained mounting system for the globular roller on the bridge system 51,52,53, without the necessity of a separate transverse axle. However, while not shown in this figure, but as will be shown hereinafter, it is possible to provide a separate fixed transverse axle extending transversely across the wings 51,52, with the globular roller 24 being rotatably mounted on suitable bearings 63 on the fixed axle.

vi Description of FIG. 25

In FIG. 25 it is seen that the bridge 250, either the front bridge 31,32,33, or the rear bridge 51,52,53, includes a plurality of upwardly extending studs 251. These studs 251 would preferably be molded, and would be inserted into suitable apertures either directly in the sole 11 or in the common plate 21. The securing is then preferably achieved by ultrasonic peening.

vii. Description of FIG. 26

Figure 26:
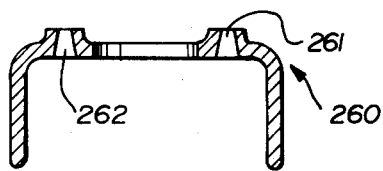

In FIG. 26, it is seen that the bridge 260 either front bridge 31,32,33 or the rear bridge 51,52,53 includes a plurality of upstanding bosses 261, each including diverging apertures 262 therein. In use, the bosses would be inserted into suitable apertures either directly in the sole 11 or in the common plate 21. The securing is then achieved by a mechanical interlock, e.g., with a blind rivet, or by a procedure known as lay-in-moulding.

viii. Description of FIG. 27

Figure 27:
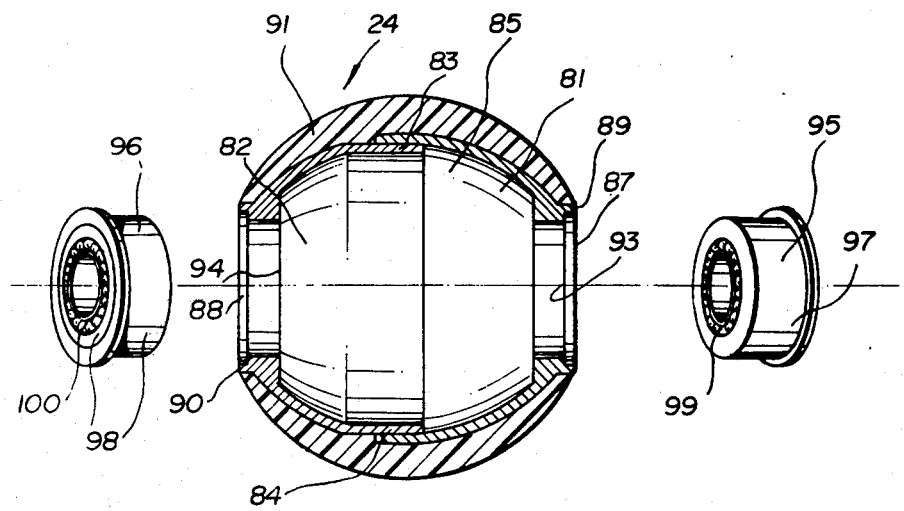
FIG. 27 is a central longitudinal cross-sectional view and partially isometric view of a typical hollow globular roller used in the skate of this invention.

A typical globular roller assembly 24 is shown in FIG. 27. The globular roller assembly 27 is either a one piece globular section or two mating semi-globular section 81,82, one section 81 being provided with a female recess 83, and the other section being provided with a male flange 84, which cooperate with one another to provide a hollow globular roller unit 85. This hollow globular roller unit 85 may be formed of any suitable structually rigid metal, e.g., aluminum, tin, copper, zinc, etc., which may preferably be formed by means of impact extrusion. In addition, the globular hollow roller units 85 may be formed by injection molding of a suitable rigid plastics material, e.g., a polycarbonate resin, nylon, ABS resin, etc.

Semi-globular segments 81,82 include a flattened planar section 87,88, disposed in a plane parallel with a raised circumferential flange-like lip 89,90, around the opening thereof. The globular roller unit 85 is then structurally united by means of a cast, or extruded resilient elastic material 91 thereon. A suitable resilient elastic material may be polyurethane, polyvinyl chloride, or natural or synthetic rubbers.

As shown in FIG. 27, the hollow globular roller is provided with a pair of diametrically opposed axial apertures 93 in planar section 87, and 94 in planar section 88, within which are forcibly placed unified bearing members 95,96 including an outer cylindrical race 97,98 and an inner bushing 99,100, separated by suitable bearing means (not seen) which may be balls, or cylindrical rollers, or non-cylindrical rollers.

ix. Description of FIG. 28

Figure 28:
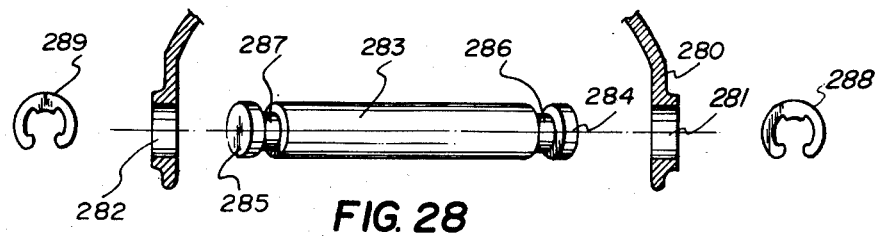
FIGS. 28 and 29 are partial isometric views showing alternative ways of rotatably mounting the globular roller.
Figure 29:
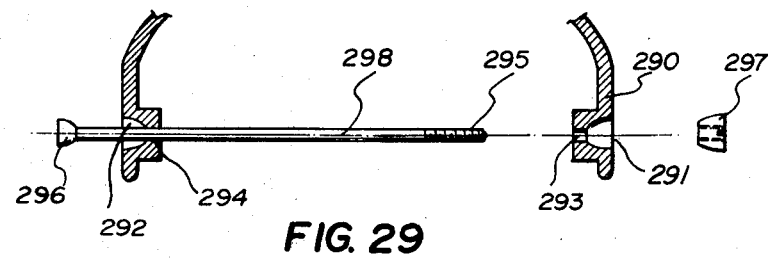

Two alternative ways of rotatably mounting the globular roller on a transverse shaft are shown in FIGS. 28 and 29. In FIG. 28, a yoke 280 is provided with a pair of aligned apertures 281,282, therein. A transverse shaft 283 is inserted in the central bushing apertures 101 in the bearings 95,96 and the ends 284,285 of the shaft are placed through apertures 281,282. The shaft ends 284,285 are each provided with a circumferential channel 286,287, within which are placed retaining rings 288,289, conveniently those known by the Trade Mark "CIRCLIP".

x. Description of FIG. 29

In the embodiment shown in FIG. 29 the yoke 290 is provided with a pair of aligned recesses 291,292, penetrated by apertures 293,294. Transverse shaft 298 is fitted through recess 292 and aperture 294 and then into bushing aperture 26 of bearing 22 and through aperture 293 and recess 291. One end 295 of shaft 298 is threaded to receive tapped retaining nut 297, which is fitted within recess 291. The other end to shaft 298 is provided with a knob 296 to fit recess 292.

xi. Description of FIG. 30

Figure 30:
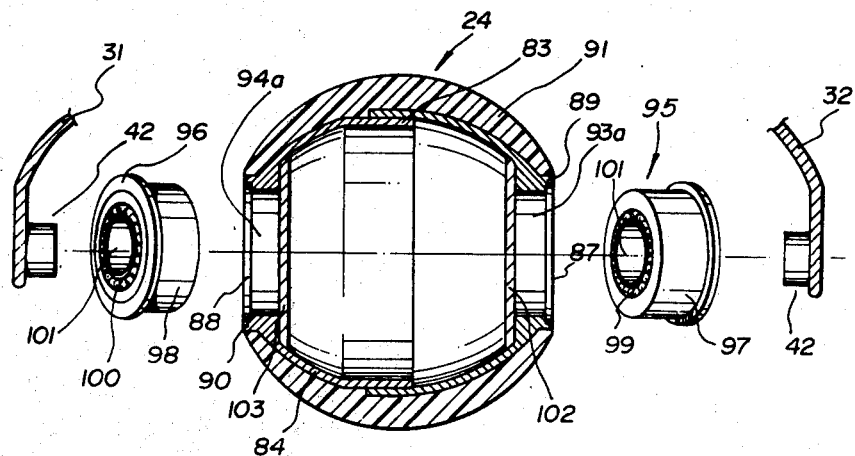
FIG. 30 is a view similar to that of FIG. 27 showing another embodiment of this invention

The embodiment shown in FIG. 30 is similar in almost all respects to that of FIG. 27 and so the same reference numbers will be used. However, instead of apertures 93 and 94, the semi-globular segments the provided with recesses 93A and 94A respectively which are provided with floors 102,103 respectively which floors 102,103 are coplanar with planar sections 87,88 respectively. Bearings 95,96 fit into recesses 93A and 93B and, in use, yoke 30 is prestressed to urge stub shaft 42 into the bushing openings 101 of bearings 95,96

SUMMARY

From the foregoing description, one skilled in the art can easily ascertain the essential characteristics of this invention, and without departing from the spirit and scope thereof, can make various changes and modifications of te invention to adapt it to various usages and conditions. Consequently, such changes and modifications are properly, equitably, and "intended" to be, within the full range of equivalence of the following claims.

We claim:

1. As a roller skating device, the combination of: a boot having the general appearance of an ice skate boot; a front roller assembly secured to the toe portion area of the boot, the front roller assembly including a bridge sub-assembly of an inverted generally U-frame shape, including a base and a pair of spaced apart depending wings, a hollow spheroidal roller having axially disposed diametrically opposed bearing surfaces, rotatably operatively engaged with respect to the spaced apart depending wings, the hollow roller being a globular roller comprising a hollow spheroidal, inner, rigid, relatively thin-walled core of structurally strong material, convered by a coating of a resilient material thereon; and a rear roller assembly secured to the heel portion of the rear area of the boot, including a bridge sub-assembly of an inverted generally U-frame shape, including a base and a pair of spaced apart depending wings, a hollow spheroidal roller having axially disposed diametrically opposed bearing surfaces rotatably operatively engaged with respect to the spaced apart depending wings, the hollow spheroidal roller being a globular roller comprising a hollow spheroidal, inner, rigid, relatively thin walled core of rigid structurally strong material covered with a coating of a resilient material.

2. The roller skating device of claim 1 wherein the front and rear assemblies are directly secured to the sole.

3. The roller skating device of claim 2 wherein the securing is by rivets.

4. The roller skating device of claim 2, wherein the securing is by clinched-over pins.

5. The roller skating device of claim 1 wherein the front and rear assemblies are secured to a plate, said plate being secured to the sole.

6. The roller skating device of claim 5 wherein the securing is by rivets.

7. The roller skating device of claim 5, whereby the securing is by screws.

8. The roller skating device of claim 5, wherein the securing is by clinched-over pins.

9. The roller skating device of claim 1 wherein each of the front and rear bridge sub-assemblies includes at least one upwardly extending stud or boss with is used as the means for securing the bridge sub-assembly to the sole of the skate boot.

10. The roller skating device of claim 1 wherein at least the sole portion of the skate boot is formed of polyurethane, and wherein the roller assemblies include an engaging surface of a polycarbonate resin so that the securement involves a fusion of the polyurethane with the polycarbonate.

11. The roller skating device of claim 10 wherein the boot is formed substantially out of polyurethane.

12. The roller skating device of claim 7, wherein the boot includes th sole of the polyurethane with the remainder of the boot being made of a material selected from the group consisting of polyvinyl chloride, leather, and any other suitable leatherlike material.

13. The roller skating device of claim 10 wherein the polycarbonate surface of the roller assemblies is substantially entirely polycarbonate.

14. The roller skating device of claim 10 wherein the roller assemblies have a glass fiber-reinforced nylon laminate-bonded to an exposed surface of a polycarbonate.

15. The roller skating device of claim 10 wherein the roller assemblies include an entire plate portion provided with a polycarbonate surface.

16. The roller skating device of claim 10 wherein the base of the inverted generally U-frame shaped bridge sub-assembly is provided with a polyurethane surface for the securement of the bridge sub-assemblies to the skate.

17. The roller skating device of claim 1 wherein the hollow spheroidal globular rollers are provided with roller or ball bearings, wherein a shaft is rotatably secured thereto. and wherein the shaft is fixedly secured to spaced apart inwardly prestressed pending wings.

18. The roller skating device of claim 1 wherein the hollow spheroidal globular rollers are provided with a race in which is provided suitable bearing surfaces, wherein said race is fixedly secured to the diametric ends of the globular roller, and wherein the depending wings are inwardly prestressed and are provided with stub shafts which engage with said bearing surfaces.

19. The roller skating device of claim 1 wherein the forward bridge sub-assembly includes an upper base of oval cross-section, a pair of spaced apart inwardly prestressed depending wings, and means associated with the base for enabling securement of the bridge sub-assembly to the toe area of th skate boot.

20. The roller skating device of claim 1 wherein the rear bridge sub-assembly includes a base of generally rectangular cross-section, a pair of spaced apart inwardly prestressed depending wings, and means associated with the base for enabling securement of the rear bridge sub-assembly to the heel area of the skate boot.

21. The skate of claim 1 wherein said boot having the general appearance of an ice skate boot, includes a rear section adjacent the region of the tibia extending beyond the region of the achilles tendon, said rear section extending along the sides of the boot and curvingly projecting above the region of the malleoli; and an additional section of the boot surface following the region of the instep, from a section abutting said rear section, thereby to provide rows of lace accepting holes, said rows of lace accepting holes ending just above the region of the toe joints.

22. The skate of claim 21 wherein the front roller assembly is disposed along the central longitudinal axis and is disposed below and slightly ahead of the region of the metatarsal head, and wherein the rear roller assembly is disposed along the central longitudinal axis and is disposed below the region of the calcaneous.

23. The skate of claim 1 including a vertical stiffener disposed within the boot at least in the region of the ankle of the boot.

24. The skate of claim 23, including a horizontal component of the vertical stiffener extending along the region of the sole of the boot.

25. The skate of claim 23, wherein the stiffener is encapsulated or encased within the structure of the boot.

26. The skate of claim 23, wherein the stiffener is formed of a springy flexible material allowing for forward and rearward movement of the stiffener but inhibiting sideways flex thereof.

27. The roller skating device of claim 1 wherein the generally U-shape frame of the front roller assembly is of an open bottom semi-globule.

28. The roller skating device of claim 1 wherein the generally U-shaped frame of the rear roller assembly is of an open bottom semi-globule.

29. The roller skating device of claim 1 wherein the generally U-shaped frame of both the front roller assembly and the rear roller assembly is of an open bottom semi-globule.

30. A roller assembly including a bridge sub-assembly of an inverted generally U-frame shape, including a base and a pair of spaced apart depending wings, a hollow spheroidal roller having axially disposed diametrically opposed bearing surfaces, rotatably operatively engaged with respect to the spaced apart depending wings, the hollow roller being a globular roller comprising a hollow spheroidal, inner, rigid, relatively thin walled core of structurally strong material covered by a coating of a resilient material thereon.

31. The roller assembly of claim 30 for use as a forward bridge sub-assembly for a roller skate assembly, wherein the forward bridge member includes an upper base of oval cross-section, a pair of spaced apart inwardly prestressed depending wings, and means associated with the base for enabling securement of the bridge sub-assembly to the toe area of th skate boot.

32. The roller assembly of claim 30 for use as a rear bridge sub-assembly for a roller skate, wherein the rear bridge member includes a base of generally rectangular cross-section, a pair of spaced apart inwardly prestressed depending wings, and means associated with the base for enabling securement of the rear bridge sub-assembly to the heel area of the skate boot.

* * * * *